United States Patent [19]

Weber et al.

[11] Patent Number: 5,300,605
[45] Date of Patent: * Apr. 5, 1994

[54] CROSS-LINKABLE POLY(UNSATURATED CARBOSILANE) HOMOPOLYMERS AND COPOLYMERS AND METHOD OF MAKING SAME

[75] Inventors: William P. Weber, Los Angeles; Xiugao Liao, Almonte, both of Calif.

[73] Assignee: University of Southern California, Los Angeles, Calif.

[*] Notice: The portion of the term of this patent subsequent to Dec. 8, 2009 has been disclaimed.

[21] Appl. No.: 34,545

[22] Filed: Mar. 19, 1993

Related U.S. Application Data

[63] Continuation-in-part of Ser. No. 838,068, Feb. 18, 1992, abandoned, which is a continuation-in-part of Ser. No. 758,638, Sep. 12, 1991, Pat. No. 5,171,810, which is a continuation-in-part of Ser. No. 636,639, Dec. 31, 1990, Pat. No. 5,169,916.

[51] Int. Cl.$^5$ ............................................ C08F 230/08
[52] U.S. Cl. ................................. 526/279; 526/166
[58] Field of Search .................... 526/279, 166

[56] References Cited

U.S. PATENT DOCUMENTS

| | | | |
|---|---|---|---|
| 4,719,273 | 1/1988 | Seyferth et al. | 528/15 |
| 5,169,916 | 12/1992 | Weber et al. | 526/279 |
| 5,171,810 | 12/1992 | Weber et al. | 526/279 |

OTHER PUBLICATIONS

S. Q. Zhou et al. (1990) Macromal 23, 1915–1917.
W. P. Weber et al. (1990) Polym Preprints 31(1), 44–45.

*Primary Examiner*—Joseph L. Schofer
*Assistant Examiner*—Mark Nagumo
*Attorney, Agent, or Firm*—Connolly & Hutz

[57] ABSTRACT

Poly(1-hydro-1-R-1-silapent-3-ene) homopolymers and copolymers contain silane segments with reactive silicon-hydride bonds and contain hydrocarbon segments with cis and trans carbon-carbon double bonds.

17 Claims, No Drawings

CROSS-LINKABLE POLY(UNSATURATED CARBOSILANE) HOMOPOLYMERS AND COPOLYMERS AND METHOD OF MAKING SAME

This is a continuation-in-part of Ser. No. 838,068 filed Feb. 18, 1992, abandoned, which is a continuation-in-part of Ser. No. 758,638, filed Sep. 12, 1991, now U.S. Pat. No. 5,171,810 which is a continuation-in-part of Ser. No. 636,639, filed Dec. 31, 1990 now U.S. Patent No. 5,169,916.

This invention was made with Government support under Contract No. AFOSR-89-0007 by the Air Force Office of Scientific Research and Contract No. N00014-89-J-1961 by the Department of the Navy.

Field of the Invention

The present invention relates to poly(carbosilane) homopolymers and copolymers and methods of making the same.

Discussion of Relevant Art

Poly(methylhydrosiloxanes) having repeating units of the formula:

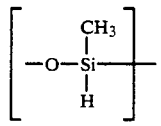

are well known. They can be prepared by hydrolysis of methyldichlorosilane or acid catalyzed ring opening polymerization of sym-tetramethylcyclotetrasiloxane. Poly(methylhydrosiloxanes) contain reactive hydride groups bound to the silicon atoms. The poly(methylhydrosiloxanes) can be crosslinked to produce elastomeric products or reacted with unsaturated monomers to yield graft copolymers.

It is also known that poly(dimethylsilane) fibers can be pyrolytically converted into silicon carbide fibers. In S. Yajima et. al., *J. Mater, Sci.* 13, 2569 (1978), it is proposed that poly(methylsilylene methylene) having repeating units of the formula:

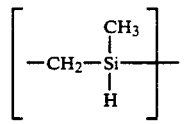

is an intermediate in the formation of the silicon carbide fibers by this process The anionic polymerization of (4-vinylphenyl)dimethylsilane to produce poly [(4-vinylphenyl)dimethylsilane] is described in Hirao, A et. al., *Macromolecules* 1987, 20, 1505. This anionic addition polymerization of carbon-carbon double bonds of (4-vinylphenyl)dimethylsilane produces polymers having repeating units of the formula: .

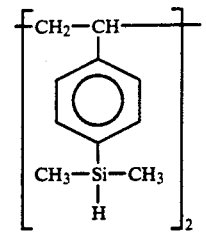

The preparation of poly(1,1 dimethyl-1-silapent-3-ene) by the metathesis ring-opening polymerization of 1,1-dimethyl-1-silacyclopent-3-ene using a WCl$_6$/Na$_2$O$_2$/Al(isoBu)$_3$ catalyst system is disclosed in Lammens, H. et. al., *Polymer Lett* 1971, 9 341 and Finkel'shtein, E. Sh. et. al., *Izvestiya Akademii Nauk SSSR, Seriya Kimicheskaya* 1981, 3, 641. The preparation of poly (1,1-dimethyl-1-silapent-3-ene) by (ADMET) polymerization is described by KB Wagener and D W Smith, Jr. in *Macromolecules* 1991, 24, 6073–6078. The preparation of poly(1,1-dimethyl-1-silapent-3-ene) and poly(1-1-diphenyl-1-silapent-3-ene) from 1,1-dimethyl-1-silacyclopent-3-ene and 1,1-diphenyl-1-silacyclopent-3-ene, respectively, by anionic ring-opening polymerization using butyllithium as a catalyst is disclosed in Horvath, R. H.; Chan, T. H., *J. Org. Chem.* 1971, 20, 4498. Anionic polymerization Of 1-methyl-1-silacyclopent-3-ene to form a homopolymer is described in S. Q. Zhou, et. al., *Macromolecules*, 23, 1915 (1990) "Anionic Ring Opening Polymerization of 2-Methyl-2-Silaindan. Characterization of the Polymer and Mechanism of Formation Polymerization", *Makromolekulare Chemie Rapid Communications*, 11, 19–24 (1990).

SUMMARY OF THE INVENTION

The present invention comprises novel poly(1-hydro-1-R-1-silapent-3-ene) polymers and copolymers, hereinafter collectively referred to as "poly(unsaturated carbo-1-H-silane) polymers and copolymers". Unlike the poly(carbosilane) polymers known in the art, some of the silane segments of the polymers in accordance with the invention contain reactive silicon-hydride bonds, while the hydrocarbon segment contains cis and trans carbon-carbon double bonds. This combination of silanes and double bonds is useful for modifying or crosslinking the polymers. For example, the polymers form high yields of ceramic material upon thermolysis.

The repeating units of the homopolymers of this invention can be represented by the general formula

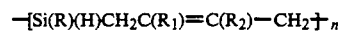

where R is hydrogen, an alkyl radical containing from one to four carbon atoms (preferably methyl) or phenyl; R$_1$ and R$_2$ are independently hydrogen, an alkyl radical containing from one to four carbon atoms (preferably methyl), phenyl or halogen; and n is an integer of at least 10.

The copolymers of this invention are random or block and are represented by the general formula

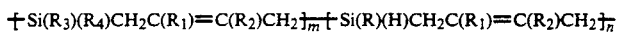

where R is hydrogen, an alkyl radical containing from one to four carbon atoms (preferably methyl) or phenyl;

$R_1$ and $R_2$ are independently hydrogen, an alkyl radical containing from one to four carbon atoms (preferably methyl), phenyl or a halogen; $R_3$ and $R_4$ represent an alkyl radical containing from one to four carbon atoms (preferably methyl) or phenyl; m and n are integers with the sum of m and n being at least 10 and with the ratio of m/n ranging from about 1/9 to about 9/1. Two or more monomers can be combined to make the copolymers of this invention.

There has also been discovered a novel method for making such poly(carbo-1-H-silane) copolymers by metathesis ring opening polymerization of silacyclopent-3-enes with an organometallic metathesis catalyst system. Under the conditions for metathesis ring opening polymerization, the silyl hydride would be expected to reduce the metal of the metathesis catalyst thereby stopping the polymerization. However, the polymerization does proceed readily giving soluble polymers of relatively high molecular weight.

DETAILED DESCRIPTION OF THE PREFERRED EMBODIMENTS

The poly(1-hydro-1-R-1-silapent-3-ene) homopolymers and copolymers, hereinafter collectively referred to as "poly(unsaturated carbo-1-H-silane) polymers", are formed by the metathesis ring opening polymerization of 1-H silacyclopent-3-ene monomers of the general formulas:

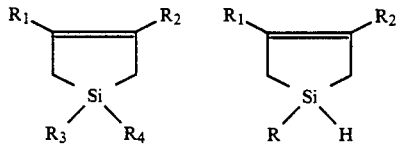

where R is hydrogen, an alkyl radical containing from one to four carbon atoms or phenyl; and $R_1$ and $R_2$ are independently hydrogen, an alkyl radical containing from one to four carbon atoms, phenyl or a halogen; and $R_3$ and $R_4$ are an alkyl radical containing one to four carbon atoms (preferably methyl) or phenyl.

Representative silylhydride bearing monomers include cyclic carbosilanes that will open by metathesis such as 1-methyl-1-silacyclopent-3-ene, 1-phenyl-1-silacyclopent-3-ene, and 1,1-dihydro-1-silacyclopent-3-ene. The preferred silylhydride bearing monomer is 1-methyl-1-silacyclopent-3-ene.

Representative comonomers include cyclic carbosilanes that will open by metathesis such as 1,1-dimethyl-1-silacyclopent-3-ene, 1,1-diphenyl-1-silacyclopent-3-ene, 1,1-diethyl-1-silacyclopent-3-ene, 1,1,3-trimethyl-1-silacyclopent-3-ene, 3-chloro-1,1-dimethyl-1-silacyclopent-3-ene, and 1-methyl-1-phenyl-1-silacyclopent-3-ene. Preferred comonomers include 1,1-dimethyl-1-silacyclopent-3-ene, 1,1,3-trimethyl-1-silacyclopent-3-ene, and 3-chloro-1,1-dimethyl-1-silacyclopent-3-ene.

As illustrated by the following reaction scheme, the monomers are typically prepared by reacting a 1,3-diene with a dichlorosilane and a metal, such as magnesium, in polar solvents, such as diethylether.

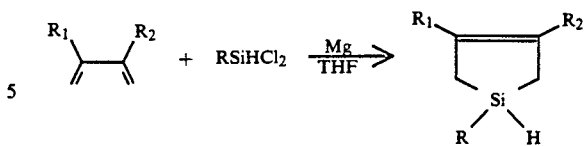

where R, $R_1$, and $R_2$ have the same meanings as above.

The ring opening polymerization reaction proceeds readily at ambient temperature and pressure to produce homopolymers and copolymers with the general structure described above.

The ring opening polymerization in accordance with this invention is carried out in the presence of known metathesis ring-opening catalyst systems, such as tungsten hexachloride and a reducing agent such as tetraphenyl tin or tetraethyl tin. Usually, the catalyst must be initiated by the presence of a small amount of cyclic olefin such as cyclopentene. This is meant to illustrate one typical catalyst system, among many catalysts that could be employed. It is surprising that silicon hydride does not interfere with the catalytic metathesis systems since Si—H bonds are well known reducing agents which would be expected to reduce the metal of the metathesis catalyst and deactivate the system.

By varying the composition and relative amounts of the comonomers, it is possible to select comonomer combinations which produce polymers having a wide range of properties and physical forms. The polymers can be tacky solids, elastomers, or thermoplastic solids having glass transition temperatures about room temperature.

The polymers can be processed thermally to produce various fabricated forms. The polymers can be combined with conventional particulate, fibrous fillers or reinforcing fibers and cloths (Kevlar, graphite fiber), and processed by blending, extrusion, molding, injection molding, compression molding, pultrusion, layup, or stamping to form rods, sheets, composites, or molded articles. Solutions containing the polymers can be coated on the surfaces of substrates to provide adhesion, environmental protection, or selective permeability.

The polymers can be modified or crosslinked to change their physical and chemical properties. The polymers can be modified by reacting the silicon-hydrogen bond, the carbon-carbon double bond or both. Representative reactions of the silicon-hydrogen bond include oxidation to Si—OH or conversion to Si—Cl, which can then be hydrolyzed to Si—OH bonds. Condensation of the silanols results in formation of siloxanes.

Representative reactions of the carbon-carbon double bonds are ionic and free radical addition reactions, such as catalytic hydrogenation, hydroboration, and the like. The permeability of polymer coatings, for example, can be varied by adding halocarbon or silane groups through addition reactions with the carbon-carbon double bond. The adhesiveness of such coatings can be increased by reacting polar groups, such as alkoxysilanes, to the carbon-carbon double bonds.

The presence of olefinic unsaturation provides convenient sites for subsequent vulcanization or cross-linking by ionic, free radical or thermal means known to the art. For example, the polymers can be crosslinked by a hydrosilation reaction in the presence of chloroplatinic acid.

A number of additives can be incorporated into the polymers of this invention. Additives such as fillers, reinforcements, and pigments are readily incorporated. Carbon black, graphite fibers, Kevlar fibers, vermiculite, mica, wollastonite, calcium carbonate, silica, fused silica, fumed silica, glass spheres, glass beads, glass cloth, ground glass, and waste glass are examples of fillers which can be incorporated. Fillers can serve either as reinforcement or as fillers and extenders to reduce the cost of the molded product. Glass spheres are useful for preparing low density composites. When used, fillers can be present in amounts up to about 85%.

Stabilizers (antioxidants) are useful to maintain the storage stability of the monomers, polymers, and the thermal oxidative stability of the final products. Among the preferred stabilizers are radical scavengers such as hindered phenols in combination with other stabilizers. Especially useful are the Tinuvin ® stabilizers available from Ciba-Geigy and the Naugard ® stabilizers from Uniroyal Chemical.

The following examples are included to further illustrate the invention. They are not limitations thereon.

NMR spectroscopy: $^1H$, $^{13}C$ and $^{29}Si$ NMR spectra were obtained either on an IBM Brucker 270-SY or an AM-360 spectrometer operating in the Fourier transform mode. $^{13}C$ NMR spectra were run with broad band proton decoupling. A heteronuclear gated decoupling pulse sequence with a pulse delay of 20 s(NONOE) was used to obtain $^{29}Si$ NMR spectra. Ten to fifteen percent solutions in CDCl$_3$ were used to obtain $^{13}C$ and $^{29}Si$ spectra. Five percent solutions were used to obtain $^1H$ NMR spectra. $^{29}Si$ NMR spectra were externally referenced to TMS.

IR Spectroscopy: IR spectra were recorded on a Perkin Elmer PE-281 spectrometer.

UV Spectroscopy: UV spectra were recorded on a Shimadzu-260 UV visible spectrometer. Spectra quality THF was used to prepare solutions for UV spectroscopy.

Gel permeation chromatography (GPC): The molecular weight distribution of the polymer was performed on a Waters system. This was comprised of U6K injector, a 510 pump, a R401 differential refractometer and a Maximum 820 data station. A 7.8 mm×30 cm Waters Ultrastyragel linear gel column packed with less than 10 µm particle size mixed pore size crosslinked styrene divinylbenzene copolymer maintained at 25° C. was used for the analysis. The eluting solvent was HPLC grade THF at a flow rate of 0.6 mL/minute. The retention times were calibrated against at least five appropriate known monodisperse polystyrene standards whose $M_w/M_n$ were less than 1.09.

Thermogravimetry (TGA): The TGA of the polymer was carried out on a Perkin-Elmer TGS-2 instrument at a nitrogen flow rate of 40 cm$^3$/minute. The temperature program for the analysis was 50° C. for 10 minutes followed by an increase of 4° C./minute to 850° C.

Elemental Analysis: Elemental Analysis was performed by Galbraith Laboratories, Knoxville, Tenn.

Preparative gas liquid phase chromatography (GLPC): GLPC analyses were carried out on a Gow-Mac 550 GC equipped with a ¼" by 10' stainless steel column packed with 10% SE-30 on Chromosorb W NAW 60/80 mesh. The column was deactivated immediately prior to use by injection of 50 µL of hexamethyldisilazane.

High resolution mass spectra: High resolution mass spectra were obtained at the University of California, Riverside Mass Spectrometry Facility on a VG 7070 EHF mass spectrometer at an ionizing voltage of 20 eV. Exact masses were determined by peak matching against known masses of perfluorokerosene.

THF was distilled from a blue solution of sodium benzophenone ketyl immediately prior to use.

Methyldichlorosilane and other silanes (from Huls America) were purified by fractional distillation.

EXAMPLE 1

1-Methyl-1-silacyclopent-3-ene

1-Methyl-1-silacyclopent-3-ene was prepared by the reaction of methyldichlorosilane, 1,3-butadiene, and magnesium in ether at room temperature. It was purified by fractional distillation through a 20-cm vacuum-jacketed Vigreux column, bp 89°–90° C. It had the following spectral properties.

$^1H$ NMR: $\delta$0.116(d,3H,J=3.4Hz), 1.16(d,2H,J=17.8Hz), 1.44(d,2H,J=17.8Hz)4.145(q,1H,J=3.4Hz), 5.78(s,2H). $^{13}C$ NMR: $\delta$-5.01, 15.36, 130.83. $^{29}Si$ NMR: $\delta$-3.19.

EXAMPLE 2

Poly(1-Methyl-1-silapent-3-ene)

A 25 ml flame dried round bottom flask equipped with a Teflon covered magnetic stirring bar was charged with tetrapheny)tin (50 mg 0.12 mmol) and 0.6 ml of 0.1 M tungsten hexachloride in chlorobenzene was injected. Then cyclopentene (10 µl) was added via a syringe and the catalyst system was stirred for 5 min at room temperature before 0.46 g 1-methyl-1-silacyclopent-3-ene was added. The reaction mixture became black in color. Keep stirring for 16 hr and the mixture became highly viscous. The polymer was dissolved in the THF and centrifuged to remove the solid catalyst. The polymer was precipitated by addition of methanol. The product polymer was purified twice in same way, vacuum dried. 0.23 g (50% yield) of the polymer was obtained. $M_w/M_n$=276,300/121,300. $^1H$ NMR: 0.50(m, 3H), 1.50–1.55(m,4H), 3.78 (m,1H)(SiH), 5.26 (t,0.3H,J=4.3 Hz), 5.33(t,1.7H,J=5.6 Hz). $^{13}C$ NMR: −6.94, −6.67, −6.40, 13.61, 13.83, 18.13, 18.46, 128.18, 23.27, 123.63. $^{29}Si$ NMR: −12.30, −12.18, −11.82. IR: 3008, 2959, 2926, 2887, 2115(s), (SiH), 1637, 1407, 1376, 1250, 1152, 1024, 880, 703. (cm−1). Tg: −79.21° C. The double bonds in the polymer are cis and trans. The ratio of the signals at 5.26 to 5.33 reflects the trans: cis ratio.

EXAMPLE 3

1,1-Diphenyl-1-silacyclopent-3-ene

Into a 1000 mL three necked rb flask, equipped with a reflux condenser was placed magnesium powder (26.4 g)(1.1 mol), diphenyldichlorosilane (253 g)(1 mol) and THF (500 mL). The reflux condenser was connected to a refrigeration unit with ethylene glycol cooled at −20° C. circulating. With stirring, 1,3-butadiene (81 g) (1.5 mol, 125 mL) at −78° C. Was transferred to this reaction system via a cannula. The reaction mixture was stirred over 72h. The reaction mixture was hydrolyzed with saturated ammonium chloride solution (100 mL) and 100 ml ether was added. The organic solution was separated. The water layer was washed with ether (2×50 mL). The combined organic solution was dried over anhydrous magnesium sulfate, filtered and the volatile solvents removed by evaporation under reduced pressure. The product was purified by distillation through a 10 cm vacuum jacketed Vigreux column. A fraction, bp 155°-7° C./0.2 mmHg, 154 g, 64% yield was collected. The following spectra properties were observed. $^1$H NMR ($\delta$)1.97 (d,4H, J=0.94Hz), 6.15(t,2H,J=0.94Hz), 7.44–7.53 (m,6H), 7.67–7.71 (m,4H). $^{13}$C NMR ($\delta$) 16.84, 127.90, 129.45, 131.00, 134.67, 135.71, $^{29}$Si NMR ($\delta$) 8.51.

EXAMPLE 4

1,1-Dimethyl-1-silacyclopent-3-ene

Into a 1000 mL three necked rb flask, equipped with a reflux condenser was placed magnesium powder (26.4 g) (1.1 mol), dimethyldichlorosilane (129 g) (1 mol) and THF (500 mL). The reflux condenser was connected to a refrigeration unit with ethylene glycol cooled to −20° C. circulating. With stirring, 1,3-butadiene 81 g (1.5 mol, 125 mL) at −78° C. was transferred to this reaction system via a cannula. The reaction mixture was stirred over 48h. The reaction mixture was hydrolyzed with saturated ammonium chloride solution (100 mL) and 100 ml ether was added. The organic solution was separated. The water layer was washed with ether (2×50 mL). The combined organic solution was dried over anhydrous magnesium sulfate, filtered and the volatile solvents removed by the fractionally distilled through a 30 cm vacuum jacketed Vigreux column. A fraction, bp 95°-99° C., 61.6 g 55% yield, was obtained. The following spectra properties were observed. $^1$H NMR ($\delta$)0.15 (S 6H), 1.25(S 4H), 5.73 (S 2H). $^{13}$C NMR ($\delta$)−2.30, 17.80, 130.74. $^{29}$Si NMR ($\delta$) 16.5.

EXAMPLE 5

Copoly(1-methyl-1-silapent-3-ene and 1,1-dimethyl-1-silapent-3-ene) by Ring Opening Metathesis Polymerization The catalyst was prepared by adding 300 mg (0.704 mmol) of tetraphenyltin, 3.6 ml of 0.1 M tungsten hexachloride/nonylphenol in toluene, and 20 μL of cyclopentene into a dry 25 ml round bottom flask equipped with a magnetic stirrer. The mixture above was stirred for 5 minutes and a solution of 0.8 g (7.14 mmol) of 1,1-dimethyl-1-silscyclopent-3-ene and 0.7 g (7.14 mmol) 1-methyl-1-silacyclopent-3-ene was added. The mixture was stirred for 60 hours at room temperature. The solvent was removed by evaporation under reduced pressure. Tetraphenyltin and tungsten hexachloride were precipitated by adding 3 ml of diethyl ether. The precipitate was washed twice with diethyl ether and the combined ether solution was evaporated under reduced pressure. The product was dissolved in THF and precipitated by adding methanol. This process (THF, methanol) was repeated and the precipitated product was dried in a vacuum dessicator. A 35% yield (540 mg) of polymer was obtained. $M_w/M_n$=23,800/9800. $^1$H NMR ($\delta$): −0.022 (m,3.2H), 0.044 (m, 1.4H), 1.41 (m,2.1H), 1.50 (m,1.9H), 3.77 (m,0.5H), (Si—H), 5.21(m,0.5H), 5 31 (m,1.5H). $^{13}$C NMR ($\delta$) −6.64, −6.38, −3.93, −3.71, −3.49, 13.54, 13.72, 13.83, 14.23, 15.56, 16.22, 16.35, 16.46, 18.13, 18.45, 20.94, 21.21, 122.51, 122.57, 123.02, 123.08, 123.14, 123.20, 123.26, 123.70, 123.76, 124.27, 124.64, 124.98. $^{29}$Si NMR ($\delta$) −12.71, −12.23, 1.40, 2.15. IR (λ) 3008, 2955, 2926, 2886, 2115, S(Si—H) 1637, 1405, 1377, 1247, 1151, 1099, 1053, 1023, 961, 931, 843, 701, cm$^{-1}$.

EXAMPLE 6

Copoly(1-methyl-1-silapent-3-ene and 1,1-diphenyl-1-silapent-3-ene) by Ring Opening Metathesis Polymerization The catalyst was prepared by adding 180 mg (0.42 mmol) of tetraphenyltin, 80 mg (0.2 mmol) tungsten hexachloride and 50 μL cyclopentene to a dry 25 ml round bottom flask equipped with a magnetic stirrer. The mixture above was stirred for a few minutes and a 1.0 g (4.2 mmol) of 1,1-diphenyl-1-silacyclopent-3-ene and 0.7 g (7.1 mmol) of 1-methyl-1-silacyclopent-3-ene was added. This mixture was stirred 24 hours at room temperature. The solvent was removed by evaporation under reduced pressure. Tetraphenyltin and tungsten hexachloride were precipitated by adding 3 ml of diethyl ether. The precipitate was washed twice with diethyl ether and the combined ether solution was evaporated under reduced pressure. The product was dissolved in THF and precipitated by adding methanol. The process (THF, methanol) was repeated and the precipitated product was dried in a vacuum dessicator. A 15% yield (250 mg) of polymer was obtained. $M_w/M_n$=19,500/10,400. $^1$H NMR ($\delta$): 0.040 (br.s, 2.3H), 1.49 (m,4.1H), 1.96 (br.s, 0.56H), 3.72 (SiH)(br.s, (0.77H), 5.26(br.s), 5.32(br.s) (2H), 7.32 (s.br.0.7H), 7.48 (s,br. 0.46H). $^{13}$C NMR ($\delta$): −6.98, −6.71, −6.41, 13.57, 13.79, 18.09, 18.42, 122.60, 123.24, 124.21, 124.61, 127.65, 129.25, 134.96, 135.49. $^{29}$Si NMR ($\delta$) −12.87, −12.72, −12.33, −10.65. IR: 3069, 3050, 3009, 2957, 2926, 2113 (s), 1636, 1429, 1401, 1376, 1313, 1251, 1153, 1108, 1053, 1027, 998, 960, 931, 881, 730, 698 (cm−1).

What is claimed is:

1. A poly(unsaturated carbosilane) comprising repeating units of the general formula

where R is hydrogen, an alkyl radical containing from one to four carbon atoms or phenyl, $R_1$ and $R_2$ are hydrogen, an alkyl radical containing from one to four carbon atoms, phenyl or a halogen, and n is from about 10 to about 10,000, and wherein both cis and trans double bonds are present in the main chain of the polymer.

2. The poly(unsaturated carbosilane) polymer as claimed in claim 1, wherein R, $R_1$ and $R_2$ are hydrogen.

3. The poly(unsaturated carbosilane) polymer as claimed in claim 1, wherein R is methyl and $R_1$ and $R_2$ are hydrogen.

4. The poly(unsaturated carbosilane) polymer as claimed in claim 1, wherein R is phenyl and $R_1$ and $R_2$ are hydrogen.

5. The poly (unsaturated carbosilane) as claimed in claim 1, wherein R is hydrogen, an alkyl radical containing from one to four carbon atoms or phenyl, $R_1$ is methyl, and $R_2$ is hydrogen.

6. A poly(unsaturated carbosilane) copolymer comprising repeating units of the formula

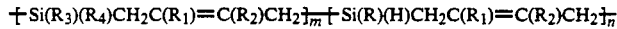

wherein R is hydrogen, an alkyl radical having from one to four carbon atoms or phenyl; $R_1$ and $R_2$ are hydrogen, an alkyl having from one to four carbon atoms, phenyl or halogen; and $R_3$ and $R_4$ are alkyl radicals having from one to four carbon atoms or phenyl; m and n are integers whose sum is at least 10 and the ratio of m/n is about 1/9 to about 9/1, and where the copolymer is comprised of at least two monomers, and wherein both cis and trans double bonds are present in the main chain of the copolymer.

7. A poly(unsaturated carbosilane) copolymer according to claim 6 wherein R is methyl, $R_1$ and $R_2$ are hydrogen, and $R_3$ and $R_4$ are methyl.

8. A poly(unsaturated carbosilane) copolymer according to claim 6 wherein R is phenyl, $R_1$ and $R_2$ are hydrogen, $R_3$ is methyl, and $R_4$ is phenyl.

9. A poly(unsaturated carbosilane) copolymer according to claim 6 wherein R is phenyl, $R_1$ and $R_2$ are hydrogen, and $R_3$ and $R_4$ are methyl.

10. A poly(unsaturated carbosilane) copolymer according to claim 6 wherein R is methyl, $R_1$ and $R_2$ are hydrogen and $R_3$ and $R_4$ are phenyl.

11. A poly(unsaturated carbosilane) copolymer according to claim 6 wherein R is hydrogen, $R_1$ and $R_2$ are hydrogen and $R_3$ and $R_4$ are phenyl.

12. A poly(unsaturated carbosilane) copolymer according to claim 6 wherein R is phenyl, $R_1$ and $R_2$ are hydrogen and $R_3$ and $R_4$ are phenyl.

13. A poly(unsaturated carbosilane) copolymer according to claim 6 wherein R is hydrogen, an alkyl radical having from one to four carbon atoms or phenyl; $R_1$ is methyl; $R_2$ is hydrogen; and $R_3$ and $R_4$ are alkyl radicals having from one to four carbon atoms or phenyl.

14. A method for preparing a poly(carbosilane) polymer comprising repeating units of the formula:

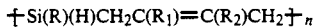

where R is hydrogen, an alkyl radical containing from one to four carbon atoms or phenyl, $R_1$ and $R_2$ are hydrogen, an alkyl radical containing from one to four carbon atoms, phenyl or a halogen, and n is from about 10 to about 10,000, comprising polymerizing at least one 1-H-silacyclopent-3-ene monomer by metathetic ring opening polymerization.

15. The method as claimed in claim 14 wherein the metathetic ring opening polymerization is carried out using a catalyst system of tungsten hexachloride and a tetra alkyl or tetra aryl tin compound.

16. A method for preparing a poly(carbosilane) copolymer having both cis and trans double bonds in the main copolymer chain and comprising repeating units of the formula:

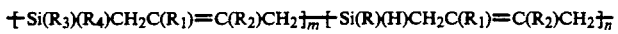

wherein R is hydrogen, alkyl having from one to four carbon atoms or phenyl; $R_1$ and $R_2$ are hydrogen, alkyl having from one to four carbon atoms, phenyl or halogen; and $R_3$ and $R_4$ are alkyl having from one to four carbon atoms or phenyl; m and n are integers whose sum is at least 10 and the ratio of m/n is about 1/9 to about 9/1, comprising copolymerizing monomers having the formulae

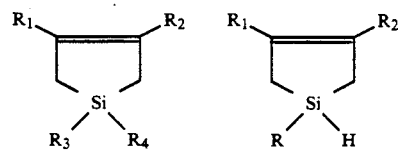

wherein $R_1$, $R_2$, $R_3$ and $R_4$ are as defined above by metathetic ring-opening polymerization.

17. The method claimed in claim 16, wherein the metathetic ring opening polymerization is carried out using a catalyst system of tungsten hexachloride and a tetra alkyl or tetra aryl tin compound.

* * * * *